US007762463B2

(12) United States Patent
Laviolette

(10) Patent No.: US 7,762,463 B2
(45) Date of Patent: Jul. 27, 2010

(54) MEMS-BASED SECURITY SYSTEM

(75) Inventor: Kerry D. Laviolette, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1188 days.

(21) Appl. No.: 11/306,650

(22) Filed: Jan. 5, 2006

(65) Prior Publication Data

US 2008/0185436 A1  Aug. 7, 2008

(51) Int. Cl.
*G06K 7/10* (2006.01)
(52) U.S. Cl. .................. 235/454; 235/379; 235/380
(58) Field of Classification Search ................. 235/454, 235/462.37, 462.4, 487, 462.36; 710/52; 359/244, 904; 257/678; 244/158.1; 705/65
See application file for complete search history.

(56) References Cited

U.S. PATENT DOCUMENTS

| 5,226,099 | A | 7/1993 | Mignardi et al. |
| 5,311,360 | A | 5/1994 | Bloom et al. |
| 5,450,491 | A * | 9/1995 | McNair ...................... 713/184 |
| 5,708,851 | A * | 1/1998 | Togawa ........................ 710/52 |
| 6,830,221 | B1 * | 12/2004 | Janson et al. ............ 244/158.1 |
| 2004/0130771 | A1 * | 7/2004 | Carlson ...................... 359/244 |
| 2004/0150869 | A1 | 8/2004 | Kasai |
| 2004/0177045 | A1 * | 9/2004 | Brown .......................... 705/65 |
| 2004/0228635 | A1 * | 11/2004 | Price .......................... 398/149 |
| 2005/0006481 | A1 * | 1/2005 | Han et al. .................... 235/487 |
| 2005/0023656 | A1 * | 2/2005 | Leedy ......................... 257/678 |
| 2006/0007514 | A1 * | 1/2006 | Desai ......................... 359/224 |
| 2006/0050892 | A1 * | 3/2006 | Song et al. ..................... 381/59 |
| 2006/0114545 | A1 * | 6/2006 | Bozler et al. ................. 359/291 |
| 2006/0136997 | A1 * | 6/2006 | Telek et al. ..................... 726/5 |

FOREIGN PATENT DOCUMENTS

WO  WO 2004015764 A2 *  2/2004

OTHER PUBLICATIONS

Huikai Xie, Yingtian Pan and Gary K. Fedder, A CMOS-MEMS; Mirror with Curled-Hing Comb Drives; Journal of Microelectromechanical Systems, vol. 12, No. 4, Aug. 2003.
G.B. Hocker, D. Youngner, E. Deutsch, S. Senturia, M. Butler, M. Sinclair and A.J. Ricco, Thy Polychromator: A Programmable MEMS Diffraction Grating for Synthetic Spectra.
Diffractive MEMOS, LightConnect.
D.M. Blom, The Grating Light Valve: Revolutionizing Display Technology; Silicon Light Machines.

* cited by examiner

*Primary Examiner*—Thien M. Le
*Assistant Examiner*—Sonji Johnson
(74) *Attorney, Agent, or Firm*—William Greener; Bond, Schoeneck & King, PLLC

(57) ABSTRACT

Embodiments of the invention is directed to a portable identification object (e.g., ID card), an object recognition system (e.g., card reader system), and a method of identity verification or authentication utilizing the portable identification object and the object recognition system. Illustratively, the ID Card incorporates an optical MEMS that, in a passive aspect, exhibits amplitude modulation, wavelength selectivity and/or optical phase modulation with respect to an input signal provided by the card reader system; and, in an active aspect, exhibits amplitude modulation, wavelength selectivity and/or optical phase modulation with respect to an input signal provided by the card reader system based on specific stimulation of the MEMS. MEMS stimulation may be activated by the card reader system in response to a selective user input (e.g., PIN) and algorithmic processing provided by the card reader system. Resultant signals produced by the MEMS ID card and read by the card reader are compared to results stored in a database. An identity or authentication determination can then be made based on the validity of the comparison.

20 Claims, 3 Drawing Sheets

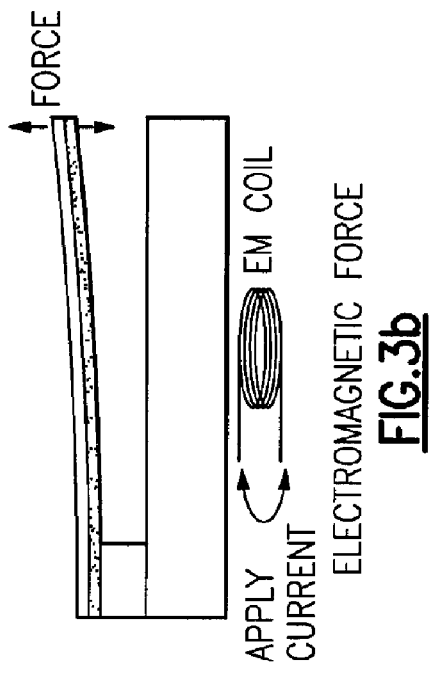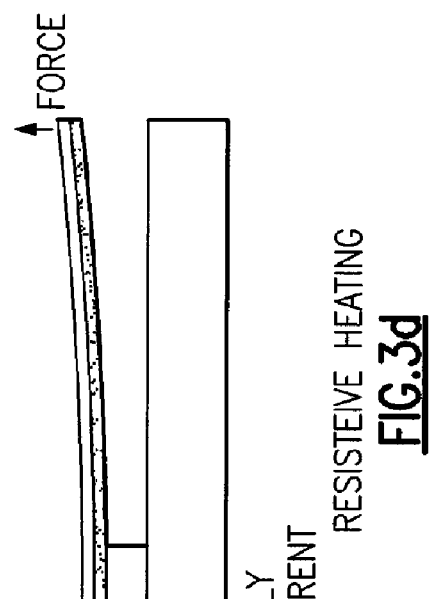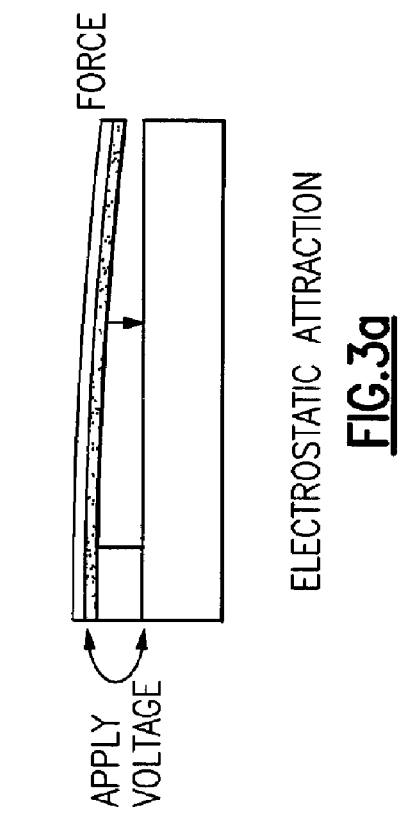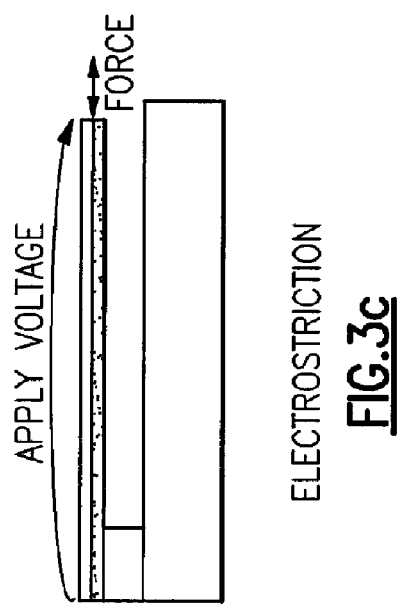

MEMS-BASED SECURITY SYSTEM

BACKGROUND OF THE INVENTION

1. Field of the Invention

Embodiments of the invention are generally directed to the field of identity verification and authentication and, more particularly, to an optical MEMS-based security object, an object reader system and method for identity verification.

2. Description of Related Art

The globalization of commerce and the threatening nature of world events over the past several years are examples of cultural behavior that have highlighted the need for increased security. Reports of identity theft are ubiquitous. Many victims have experienced financial catastrophe. At the extreme end of the spectrum, there is concern over national security. The ability to verify or authenticate identity is of paramount importance in effecting the various levels of security that people and institutions rely on to protect their lives, their freedom and their resources.

Ever since the use of debit cards and Internet-based transactions became widespread, magnetically encoded data, personal identification numbers (PINs) and/or passwords have been relied on as the primary interfaces for protecting one's assets and security. These have proven, however, to be easily bypassed. An illuminating anecdote is of the ersatz ATM in a shopping mall. The unsuspecting user inputs their card into a card reader and enters their PIN via a keypad interface. The 'out of order—sorry for the inconvenience' message that they get instead of the expected stack of $20 bills literally translates to 'thank you for letting us record your bank account information and your personal access code'.

More sophisticated forms of identity authentication and verification have been rapidly developing over the past several years. The field of biometric security utilizes the unique attributes of fingerprints or iris patterns, for example, to identify an individual out of a database limited only by the amount of data it can hold. Biometric systems and methods, however, are expensive and their reliability has yet to be proven failsafe.

In view of the foregoing considerations, the inventor has recognized a need for security apparatus and methods that are absolutely reliable, tamper-proof, technically feasible and cost effective to make and use, and which overcome the issues outlined above and others recognized by those skilled in the art.

SUMMARY OF THE INVENTION

An embodiment of the invention is directed to a portable identification object intended for use with an object recognition system. Non-limiting exemplary aspects of the form of the portable identification object may be an 'identification (credit/debit-type) card', 'key-card', or 'security access badge'. Similarly, a non-limiting example of the object recognition system may be a 'card reader' or 'badge reader' in accordance with an embodiment of the invention described herein below. As a matter of convenience only, embodiments of the portable identification object will hereinafter be referred to as the 'ID card', and the object recognition system will hereinafter be referred to as the 'card reader'.

In general terms, an ID card incorporates an optical MEMS that, in a passive aspect, exhibits amplitude modulation, wavelength selectivity and/or optical phase modulation with respect to an input signal provided by the card reader system; and, in an active aspect, exhibits amplitude modulation, wavelength selectivity and/or optical phase modulation based on specific stimulation of the MEMS. MEMS stimulation may be activated by the card reader system in response to a selective user input (e.g., PIN) and algorithmic processing provided by the card reader system. Resultant signals produced by the MEMS ID card and read by the card reader are compared to results stored in a database. An identity or authentication determination can then be made based on the validity of the comparison.

According to the embodiment, the ID card includes a base member and an optical MEMS (microelectromechanical system) disposed in the base member. In an aspect, the optical MEMS is a passive MEMS. Alternatively or in combination therewith, the optical MEMS is an active MEMS. As used herein, the term 'passive MEMS' generally means that other than providing necessary power and light to the MEMS ID card, no other stimulation is provided to cause any kind of dynamic response in the card. It also refers to an attribute of the MEMS ID card that does not require a particular user input to activate a dynamic MEMS-driven response. The term 'active MEMS', on the other hand, refers to the use of a changing electrical input (e.g., voltage over time) resulting in MEMS 'movements' or modulation to actively modulate an input signal. In this respect, the ID may require, via the card reader, a particular user input to activate a desired dynamic MEMS response. A suitable personal identification number (PIN) is a non-limiting example of a particular user input.

According to the passive MEMS aspect, a plurality of passive MEMS device components will have the capability to amplitude-modulate, wavelength-(frequency) modulate and/or phase modulate an input signal. Non-limiting examples of passive MEMS device components include reflective microelectromechanical system components and diffractive microelectromechanical system components known in the art. According to the active MEMS aspect, a plurality of active components, in response to a particular stimulus, will be able to specifically amplitude-modulate, wavelength-(frequency) modulate and/or phase-modulate an input signal. Non-limiting examples of active components include reflective microelectromechanical system component and diffractive microelectromechanical system component known in the art.

The particular MEMS design and manufacture is not, per se, part of the invention. The requisite underlying optical MEMS technology is in place. The interested reader is referred to the following publications, which describe the fabrication and uses of reflective and diffractive MEMS: U.S. Pat. Nos. 5,226,099 entitled *Digital Micromirror Shutter Device*; and 5,311,360 entitled *Method and Apparatus for Modulating a Light Beam*; US Publication No. 2004/0150869 entitled *MEMS Device and Methods for Manufacturing Thereof, Light Modulation Device, GLV Device and Methods for Manufacturing Thereof, and Laser Display*, Xie et al., *A CMOS-MEMS Mirror With Curled-Hinge Comb Drives*, Journal of Microelectromechanical Systems, 12, 4 (August 2003); Hocker et al., *The Polychromator: A Programmable MEMS Diffraction Grating For Synthetic Spectra; Diffractive MEMS* (http://www.lightconnect.com/technology/DMEMSWhitePaper3.pdf); and, Bloom, *The Grating Light Valve: revolutionizing display technology* (http://www.siliconlight.com/htmlpgs/homeset/homeframeset.html). The disclosure of each of the publications is herein incorporated by reference in its entirety to the fullest extent allowed by applicable laws and rules. According to embodiments of the invention, the optical MEMS is advantageously produced by available CMOS process technology. CMOS process technology can provide cost efficient, mass production capability of optical MEMS suitable for the ID card.

Another embodiment of the invention is directed to a card reader. The card reader facilitates all interaction with the ID card and the bearer of the card, including providing the active and/or passive signals that stimulate the ID card MEMS, resultant signal processing, verification and communication with a controlled access point.

According to the embodiment, the card reader includes a power supply, an ID card interface containing a MEMS stimulation source and a resultant signal receiver, a user interface, and a computing platform that provides instructions and services to the power supply, the card interface and the user interface. In various aspects, the MEMS stimulation source could be an electrical source or an optical source. In the optical source aspect, a white light source or one or more wavelength specific sources may be provided. In the electrical source aspect, the card reader may incorporate an electrostatic source, an electromagnetic source, an electrostrictive source and a resistive heating source, depending upon the type of MEMS in the ID card. Exemplary aspects of the resultant signal receiver include a direct detection receiver and a coherent detection receiver.

Another embodiment of the invention is directed to a method of identity verification or authentication. The method involves the steps of providing an ID card that includes a base member and an optical MEMS disposed therein; providing a card reader having an input signal generator and a MEMS stimulation source; generating a resultant signal from the optical MEMS upon stimulation of the MEMS that is specifically amplitude-modulated, wavelength- or frequency-modulated, and/or phase-modulated; comparing the resultant modulated signal to a reference signal stored in a database of the card reader system; and, determining whether the comparison is sufficient to authenticate the identity in question. According to an exemplary active aspect, the step of generating a particularly modulated resultant signal comprises providing a suitable user PIN via a user interface to activate the MEMS stimulation source and particularly configure the optical MEMS. According to various aspects, the step of determining whether the comparison is sufficient to authenticate identity involves making an initial verification using a passive optical MEMS and/or making a full verification using the active optical MEMS. According to a particular aspect, the modulation of the card reader's electrical or optical input signal ban be changed substantially instantaneously. The MEMS dynamic response would thus change and consequently, the resultant output signal modulation would change. In this regard, the card reader database would contain a number of differing security algorithms associated with the various input modulation parameters. Upon the confirmed or suspected compromise of the instant security algorithm, a new authentication/verification scheme could be implemented.

The foregoing and other objects, features, and advantages of embodiments of the present invention will be apparent from the following detailed description of the preferred embodiments, which make reference to the several drawing figures.

BRIEF DESCRIPTION OF THE DRAWINGS

FIGS. 3a, 3b, 3c and 3d are schematic diagrams illustrating alternative types of electrical actuation of active MEMS devices to assist in understanding embodiments of the invention.

DETAILED DESCRIPTION OF EMBODIMENTS OF THE INVENTION

Embodiments of the invention are directed to an optical MEMS-based ID card, a card reader, and a method for verifying and/or authenticating an identity or other information, utilizing the ID card and card reader.

Figure 1:
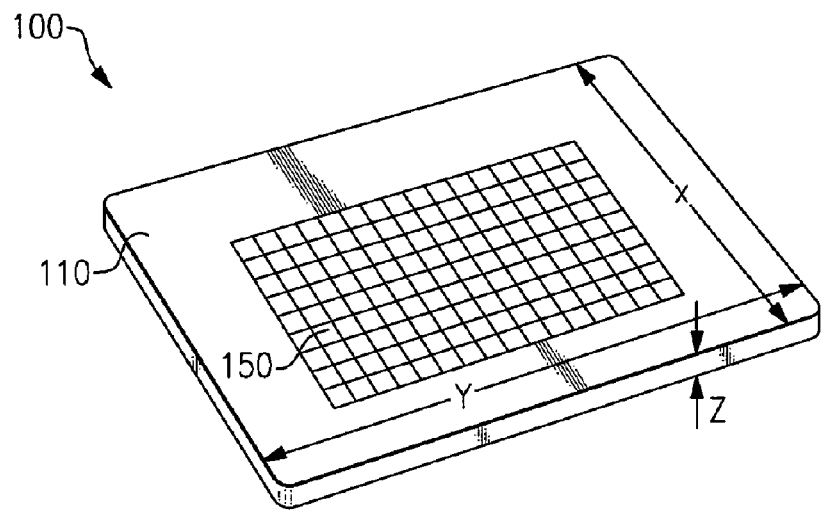
FIG. 1 is a schematic diagram of an optical MEMS ID card according to an illustrative embodiment of the invention.

FIG. 1 shows an ID card 100 according to an illustrative embodiment of the invention. The ID card 100 includes a base member 110 and an optical MEMS 150 disposed in the base member. As shown in FIG. 1, the ID card 100 has a form factor that is generally rectangular in the x-y plane with a thickness z sufficient to support the MEMS 150. It will be appreciated that the MEMS device 150 provides the functional attributes of the ID card while the base member 110 provides structural support and protection. As such, overall size, shape, aspect ratio and other appearance attributes of the ID card may vary depending upon the physical MEMS characteristics and requirements, card reader attributes, convenience and other form considerations. An employee badge and a key card are other non-limiting exemplary form factors for the ID card.

Figure 2:
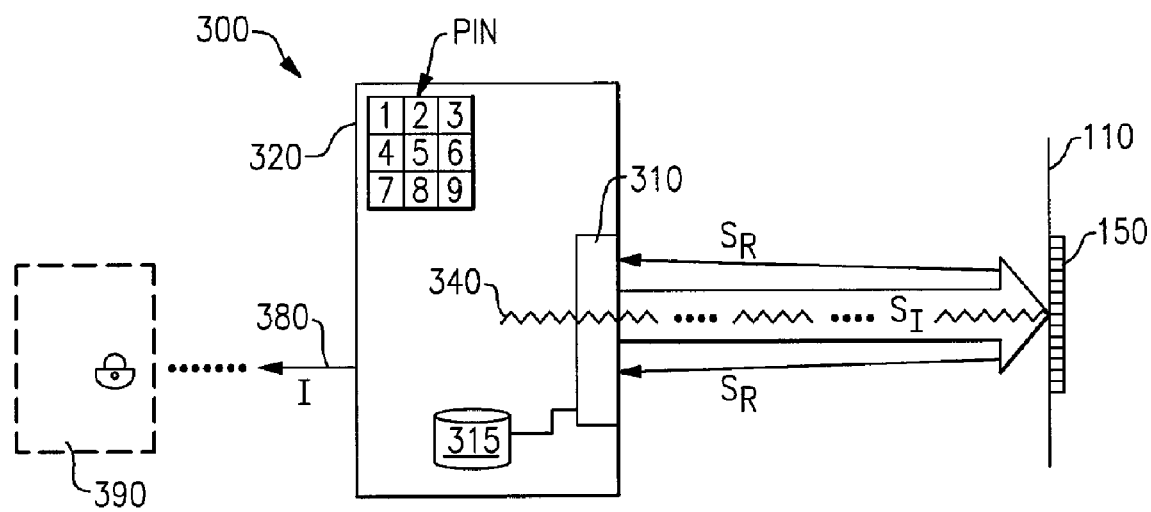
FIG. 2 is a line drawing illustrating principals of operation of the ID card and card reader according to an embodiment of the invention.

The optical MEMS constituting a part of the present embodiment may be a passive MEMS, an active MEMS or a combination passive/active MEMS, to be described further below. An exemplary illustration of operation is shown with reference to FIG. 2. A card reader system 300 (described below) provides an input light signal $S_I$ to the optical MEMS 150 imbedded in the ID card 100 (this interaction would take place in the card reader system but is shown in an open environment for ease of illustration. The input light signal $S_I$ may be white light, monochromatic light or light of multiple monochromatic wavelengths. The light may be modulated in the card reader and/or my the MEMS response. The MEMS 150 includes a plurality of reflective or diffractive MEMS device structures in a preconfigured arrangement that selectively modulate the amplitude, wavelength or phase of the input signal to produce a resultant signal $S_R$. The resultant signal $S_R$ is received, digitized and/or otherwise processed in the card reader system by suitable hardware and software 310. For example, the resultant signal may be received by a direct detection receiver that converts optical power to electrical current. Alternatively, a coherent receiver may be employed that converts the resultant amplitude-, wavelength- or phase-modulated signal to an electrical signal. The signals can then be either analog processed or digitized and processed through an appropriate signal processing algorithm. The result can then be compared against the expected result for a confirmation match or otherwise. The card reader 300 will validate the resultant signal based on a predetermined processing result stored in a system data base 315. If validation is successful, the card reader system will generate an instruction, I, at 380 and communicate the instruction to the restricted access point shown as the padlock at 390. As described above, the optical MEMS is preconfigured, or static, and is considered a passive MEMS as that term is used herein.

In an alternative aspect referring to an active MEMS, a user may be required to enter a PIN into the card reader system via a keypad 320 or other suitable user interface. Based on the user's PIN and the programming of the MEMS device, the card reader system may generate a stimulation signal $S_S$, shown at 340. The stimulation signal $S_S$ specifically activates the MEMS, which is programmed to selectively modulate the amplitude, wavelength or phase of the input signal $S_I$ to generate an encoded resultant signal $S_R$. If the resultant signal matches a predetermined processing result stored in a system data base 315, the card reader will validate the signal and communicate the instruction to the restricted access point. In this aspect, the optical MEMS is externally activated and is considered an active MEMS as that term is used herein.

FIGS. 3a-3d show four different methods for, or types of, electrical activation of active MEMS devices as known in the art. The figures, respectively, illustrate electrostatic activation, electromagnetic activation, electrostrictive activation and resistive heating activation for stimulating the optical MEMS.

Figure 4:
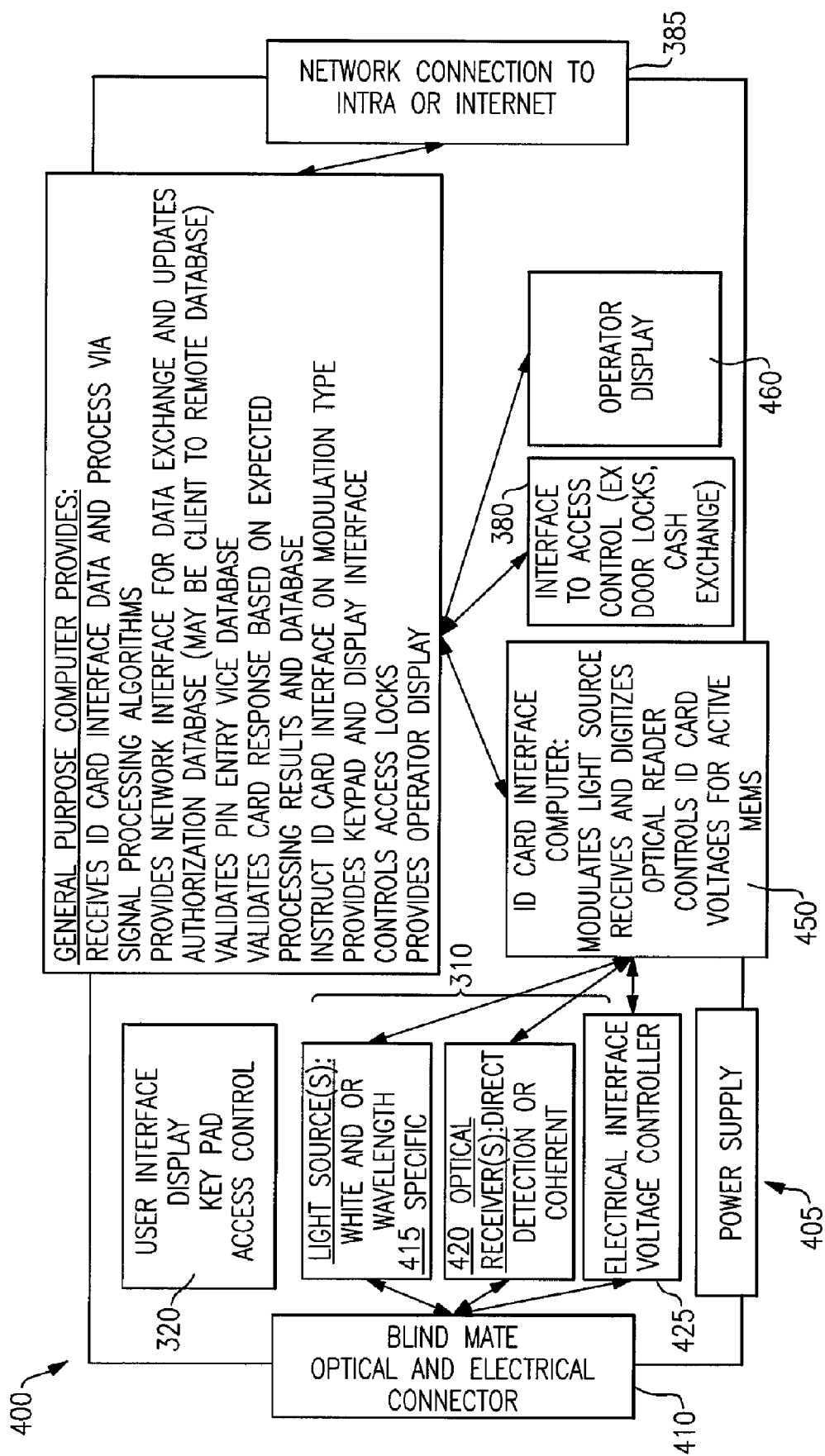
FIG. 4 is a schematic block diagram of a card reader system according to an illustrative embodiment of the invention.

FIG. 4 shows a schematic block diagram 400 of a card reader system 300. The card reader includes a power supply 405 that, among other things, powers the ID card interface 410. The card interface 410 may contain the input light source or sources 415 (including the MEMS stimulation source), an optical receiver or receivers 420 and a voltage controller 425, which function as component 310 described in reference to FIG. 2. Depending upon the input light source(s), the receiver(s) may be direct detection or coherent radiation detectors, or any optical heterodyne receiver. The ID card interface 320 is operationally connected to a card interface computing platform 450. The computing platform 450, in an illustrative aspect, provides control and/or executable instructions for modulating the light source; receiving, digitizing and processing the resultant light signal from the MEMS; controlling the voltage to the voltage controller for the active MEMS activation; interacting with a user interface 320; and, communicating with restricted access points and intra-network and inter-network connections. The user interface 320 can also provide a variety of functions. In an exemplary aspect, the user interface 320 receives and signal-processes ID card interface data; provides a network interface for data exchange and updates; provides database authorization (e.g., client to remote database); accepts and validates PIN entry; validates ID card response based on expected processing results and database contents; instructs the ID card interface on modulation format; provides a keypad and display interface; controls access points; and, provides an operator display.

Advantageously, system hardware and software complexity can be based on a predetermined need for a particular level of security. For example, a less complex, lower level system may employ a single white light or monochromatic source and a signal processing algorithm for analyzing resultant signal amplitude data. A more complex, higher level system may utilize multiple light wavelength input signals and perform resultant signal processing based on wavelength analysis, coherent frequency analysis, phase discrimination and/or other digital and/or optical signal processing schemes.

Advantageously, known CMOS process technology for making an optical MEMS as described herein offers a relatively inexpensive manufacturing platform for mass producing the optical MEMS ID cards. Moreover, the resultant system will be highly tamper-proof. The relative technical complexity of the card reader will make it challenging to reconstruct or falsely construct. The ID card will also be highly tamper-proof since the optical MEMS would likely be destroyed in an attempt to reproduce or falsely reconfigure the MEMS.

The foregoing description thus discloses to those persons skilled in systems engineering, opto-electronics, computer programming and interrelated disciplines an optical MEMS-based ID card, an associated card reader, and a method for identity verification or authentication utilizing the ID card and card reader. The specification and implementation of a particular system will depend on an applications analysis that can readily be performed by a person of skill in the art.

The foregoing description of the embodiments of the invention have been presented for the purposes of illustration and description. They are not intended to be exhaustive or to limit the embodiments of the invention to the precise forms disclosed. Many modifications and variations are possible in light of the above teachings. It is intended that the scope of the embodiments of the invention be limited not by this detailed description but rather by the claims appended hereto.

What is claimed is:

1. An object reader system intended for cooperative engagement with a MEMS based portable identification object, comprising:
   a power supply;
   an object reader interface including an input signal source, a MEMS stimulation source and a resultant signal receiver;
   a user interface having an operational gate-keeping functionality including at least one of signal processing, network interfacing, database authorization, device modulation format instruction, and user verification; and
   a computing platform operationally interfaced to the power supply, the object reader interface and the user interface.

2. The object reader system of claim 1, wherein the input signal source is at least one of an optical source and an electrical source.

3. The object reader system of claim 2, wherein the optical source is at least one of a white light source and a wavelength specific source.

4. The object reader system of claim 1, wherein the resultant signal receiver comprises at least one of a direct detection receiver and a coherent detection receiver.

5. The object reader system of claim 1, wherein the MEMS stimulation source comprises one of an electrostatic source, an electromagnetic source, an electrostrictive source and a resistive heating source.

6. The object reader system of claim 1, wherein the object reader interface further comprises at least one of a MEMS stimulation source modulator and a signal digitizer.

7. The object reader system of claim 6, wherein the MEMS stimulation source modulator is selectively variable, further wherein a selected modulation format is operationally associated with one of a plurality of security algorithms stored in a database of the object reader.

8. The object reader system of claim 1, wherein the user interface comprises at least one of a user display medium, a user data-input component and a restricted access controller.

9. The object reader system of claim 1, wherein the computing platform is further operationally interfaced to at least one of an intra-network and an inter-network.

10. The object reader system of claim 1, further comprising a MEMS-based portable identification object that is readable, by the object reader interface.

11. The object reader system of claim 10, wherein the MEMS-based portable identification object includes a base member and an optical MEMS disposed in the base member.

12. The object reader system of claim 11, wherein the optical MEMS is at least one of a passive MEMS, an active MEMS and a combination passive/active MEMS.

13. The object reader system of claim 12, wherein the passive MEMS includes a plurality of passive MEMS device components that can at least one of amplitude-modulate, wavelength- or frequency-modulate and phase modulate an input signal.

14. The object reader system of claim 13, wherein the plurality of passive components are one of optically reflective structures and optically diffractive structures.

15. The object reader system of claim 12, wherein the active MEMS includes a plurality of active components that can at least one of amplitude-modulate, wavelength- or frequency-modulate and phase-modulate an input signal.

16. The object reader system of claim 15, wherein the plurality of active components are one of optically reflective structures and optically diffractive structures.

17. The object reader system of claim 11, wherein the base member has a form factor substantially similar to that of a credit/debit card.

18. The object reader system of claim 11, wherein the base member has a form factor substantially similar to that of a key card.

19. A method of identity verification or authentication, comprising:
    providing a portable identification object that includes a base member and an at least one of a passive optical MEMS and an active optical MEMS disposed in the base member;
    providing a portable identification object reader having an input signal source;
    generating at least one of a resultant amplitude-modulated, a wavelength- or frequency-modulated and a phase-modulated signal from the MEMS;
    comparing the resultant modulated signal to a reference indicia; and
    determining whether the comparison is sufficient to authenticate identity by making an initial verification using the passive optical MEMS and making a full verification using the active optical MEMS.

20. A method of identity verification or authentication, comprising:
    providing a portable identification object that includes a base member and an at least one of a passive optical MEMS and an active optical MEMS disposed in the base member;
    providing a portable identification object reader having an input signal source;
    generating at least one of a resultant amplitude-modulated, a wavelength or frequency-modulated and a phase-modulated signal from the MEMS;
    comparing the resultant modulated signal to a reference indicia; and
    determining whether the comparison is sufficient to authenticate identity by making an initial verification using the passive optical MEMS and making a full verification using the active optical MEMS.

* * * * *